UNITED STATES PATENT OFFICE.

JOHAN GUSTAF WIBORGH, OF STOCKHOLM, SWEDEN.

PHOSPHATE AND METHOD OF MAKING SAME.

SPECIFICATION forming part of Letters Patent No. 601,089, dated March 22, 1898.

Application filed February 18, 1896. Serial No. 579,780. (No specimens.)

*To all whom it may concern:*

Be it known that I, JOHAN GUSTAF WIBORGH, a subject of the King of Sweden and Norway, and a resident of Stockholm, Sweden, have invented a certain new and Improved Method of Making Apatite More Soluble and of Manufacturing a Fertilizer Therefrom, of which the following is a specification.

The invention consists of a method of manufacturing from apatite a phosphate suitable as a fertilizer. It consists in pulverizing the apatite and mixing it with a sufficient quantity of carbonate of sodium or potassium or of caustic soda or potash, and subsequently heating the mixture to a red or yellow heat in order to get a tetra-calcium-sodium (or potassium) phosphate, to be formed according to the following equation:

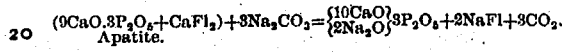

In this instance there is one molecule apatite to three molecules carbonate of sodium. If the apatite should contain feldspar (or silicic acid)—say, for instance, one molecule feldspar—two molecules carbonate of sodium more are needed according to the equation:

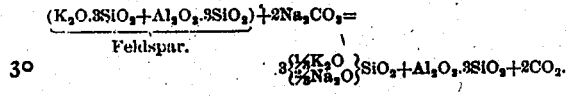

Thus twenty per cent. to thirty-five per cent. carbonate of sodium (anhydrous) or sixteen per cent. to twenty-seven per cent. caustic soda or equivalent quantities carbonate of potassium or caustic potash will be required.

Where the material which is heated with the apatite is one containing sodium, it will be in proportion to yield a compound containing the ratio of about four hundred and twenty-six of phosphoric acid to five hundred and sixty of oxid of calcium and about one hundred and twenty-four of oxid of sodium. Where the material contains potassium instead of sodium, it will be in a proportion to yield a compound containing the ratio of about four hundred and twenty-six of phosphoric acid to five hundred and sixty of oxid of calcium and about one hundred and eighty-eight of oxid of potassium. This tetra-calcium-sodium (or potassium) phosphate is insoluble in water, but easily soluble in the solution of citrate of ammonia of P. Wagner.

I claim as my invention—

1. The herein-described method of manufacturing from apatite a fertilizer which consists in heating to a red or yellow heat the apatite together with a matter containing sodium (or potassium) in proportion to yield a compound containing the ratio of about four hundred and twenty-six of phosphoric acid to five hundred and sixty of oxid of calcium and from about one hundred and twenty-four to one hundred and eighty-eight of oxid of sodium (or potassium), substantially as described.

2. A tetra-calcium-sodium (or potassium) phosphate readily soluble in citrate of ammonia, for use as a fertilizer, having in the case of sodium the formula

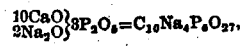

substantially as described.

In testimony whereof I have signed my name to this specification in the presence of two subscribing witnesses.

JOHAN GUSTAF WIBORGH.

Witnesses:
　CARL P. GERELL,
　FREDRIK L. ENQUIST.